United States Patent
Chang

(10) Patent No.: US 10,766,126 B2
(45) Date of Patent: Sep. 8, 2020

(54) PNEUMATIC SIGNAL GENERATING DEVICE FOR A PNEUMATIC TOOL

(71) Applicant: AIRBOSS AIR TOOL CO., LTD., Taichung (TW)

(72) Inventor: Hsin-He Chang, Taichung (TW)

(73) Assignee: AIRBOSS AIR TOOL CO., LTD., Taichung (TW)

(*) Notice: Subject to any disclaimer, the term of this patent is extended or adjusted under 35 U.S.C. 154(b) by 282 days.

(21) Appl. No.: 15/914,248

(22) Filed: Mar. 7, 2018

(65) Prior Publication Data

US 2019/0277410 A1  Sep. 12, 2019

(51) Int. Cl.
| | |
|---|---|
| *B25F 5/02* | (2006.01) |
| *F16K 11/04* | (2006.01) |
| *B25B 21/00* | (2006.01) |
| *B23Q 5/06* | (2006.01) |

(52) U.S. Cl.
CPC ........... *B25B 21/00* (2013.01); *B25F 5/02* (2013.01); *F16K 11/04* (2013.01); *B23Q 5/06* (2013.01); *B23Q 2705/04* (2013.01)

(58) Field of Classification Search
CPC ....... F16K 11/04; B23Q 5/06; B23Q 2705/04; B23B 45/04; B23B 2270/027; B25B 23/145; B25B 23/1453
USPC ............................. 173/218–221, 168, 169; 137/625.48–625.5, 557
See application file for complete search history.

(56) References Cited

U.S. PATENT DOCUMENTS

| | | | | |
|---|---|---|---|---|
| 2,476,486 A | * | 7/1949 | Ferguson | B25B 23/145 173/221 |
| 2,635,623 A | * | 4/1953 | Moffett | B60S 5/043 137/229 |
| 2,764,175 A | * | 9/1956 | Mercier | F16K 17/00 137/109 |

(Continued)

FOREIGN PATENT DOCUMENTS

| | | |
|---|---|---|
| CN | 107000190 A | 8/2017 |
| TW | I439356 B | 6/2014 |

(Continued)

OTHER PUBLICATIONS

Extended European Search Report for European Patent Application No. 18159890.5, dated Aug. 29, 2018, 5 pages.

*Primary Examiner* — Stephen F. Gerrity
*Assistant Examiner* — Joshua G Kotis
(74) *Attorney, Agent, or Firm* — Withrow & Terranova, P.L.L.C; Vincent K. Gustafson

(57) ABSTRACT

A pneumatic generating device has a valve sleeve, a valve core, a piston pin, and a guiding assembly. The valve sleeve has a sleeve chamber and an input end. The valve core is mounted rotatably in the valve sleeve and has an axial hole and an annular groove. The annular groove is defined around the valve core. The piston pin is mounted moveably in the axial hole and has an end extending out of the input end of the valve sleeve and combined with a sealing cap. The guiding assembly is combined rotatably with the valve core and has a signal member and a guiding tube. The signal member is held in the annular groove in the valve core and has a passage communicating with the sleeve chamber. The guiding tube is connected with signal member and communicates with the passage in the signal member.

3 Claims, 6 Drawing Sheets

(56) References Cited

U.S. PATENT DOCUMENTS

| | | | | |
|---|---|---|---|---|
| 3,087,466 A | * | 4/1963 | Tobias | B25C 1/041 |
| | | | | 91/408 |
| 3,259,144 A | * | 7/1966 | Taplin | G05D 16/0655 |
| | | | | 137/505.41 |
| 3,738,385 A | * | 6/1973 | Gerod | D06F 71/34 |
| | | | | 137/606 |
| 4,901,761 A | * | 2/1990 | Taylor | E21B 21/08 |
| | | | | 137/557 |
| 6,050,296 A | * | 4/2000 | Hoffmann | F16K 41/10 |
| | | | | 137/552 |
| 6,062,248 A | * | 5/2000 | Boelkins | F16K 15/148 |
| | | | | 137/118.02 |
| 6,135,213 A | * | 10/2000 | Schoeps | B25B 21/00 |
| | | | | 173/169 |
| 2006/0102236 A1 | * | 5/2006 | Phillips | F16K 37/0008 |
| | | | | 137/557 |
| 2017/0312899 A1 | * | 11/2017 | Jansson | B25B 21/02 |

FOREIGN PATENT DOCUMENTS

| | | |
|---|---|---|
| TW | M485792 U | 9/2014 |
| TW | I584921 B | 6/2017 |
| WO | 9611090 A1 | 4/1996 |
| WO | 2016055566 A1 | 4/2016 |

\* cited by examiner

PNEUMATIC SIGNAL GENERATING DEVICE FOR A PNEUMATIC TOOL

BACKGROUND

Field of the Invention

The present invention relates to a signal generating device, and more particularly to a pneumatic signal generating device for a pneumatic tool.

Description of Related Art

With reference to FIG. 6, a conventional pneumatic tool 70 substantially comprises a body 71, a driving device 72, a trigger assembly 73, and a silencer 74. The body 71 has a holding chamber 711, a trigger chamber 712, an inlet channel 713, and an outlet channel 714. The trigger chamber 712 is adjacent to the holding chamber 711 and extends laterally. The inlet channel 713 and the outlet channel 714 communicate with the trigger chamber 712. The driving device 72 is mounted in the holding chamber 711, and the trigger assembly 73 is mounted in the trigger chamber 712. The silencer 74 is mounted on a bottom of the body 71 and communicates with the outlet channel 714.

When the conventional pneumatic tool 70 is in use, the body 71 is connected with an air compressor by a pipe and compressed air can be led into the inlet channel 713. When the trigger assembly 73 is pressed, the compressed air is led into the holding chamber 711 to actuate the driving device 72 and the pneumatic tool 70 works. In addition, redundant air will be discharged from the outlet channel 714.

The compressed air is the power source for driving the conventional pneumatic tool 70 to operate, but the pressure of the compressed air is unstable and is not easily detected. Therefore, to detect the pressure in the pneumatic tool and the pressing times of the trigger assembly 73 is difficult.

When the conventional pneumatic tool 70 is in use, the body 71 is connected with an air compressor by a pipe and compressed air can be led into the inlet channel 713. When the trigger assembly 73 is pressed in the direction D, the compressed air is led into the holding chamber 711 to actuate the driving device 72 and the pneumatic tool 70 works. In addition, redundant air will be discharged from the outlet channel 714.

To overcome the shortcomings, the present invention tends to provide a pneumatic signal generating device for a pneumatic tool to mitigate or obviate the aforementioned problems.

SUMMARY

The main objective of the invention is to provide a pneumatic signal generating device that is applied to detect the conditions of a pneumatic tool.

The pneumatic generating device has a valve sleeve, a valve core, a piston pin, and a guiding assembly. The valve sleeve has a sleeve chamber, an opening, and an input end. The sleeve chamber is defined in the valve sleeve. The opening is defined in an end of the valve sleeve and communicates with the sleeve chamber. The input end is defined in an end of the valve sleeve opposite the opening. The valve core is mounted rotatably in the sleeve chamber of the valve sleeve and has an axial hole and an annular groove. The axial hole is defined axially through the valve core. The annular groove is defined around an outer surface of the valve core. The piston pin is mounted moveably in the axial hole in the valve core and has an end extending out of the input end of the valve sleeve and combined with a sealing cap. The guiding assembly is combined rotatably with the valve core and has a signal member and a guiding tube. The signal member is combined with the valve core, is held in the annular groove in the valve core, and has a passage defined in the signal member and communicating with the sleeve chamber of the valve sleeve. The guiding tube is connected with the signal member and communicates with the passage in the signal member.

Other objects, advantages and novel features of the invention will become more apparent from the following detailed description when taken in conjunction with the accompanying drawings.

DETAILED DESCRIPTION OF PREFERRED EMBODIMENT

Figure 1:
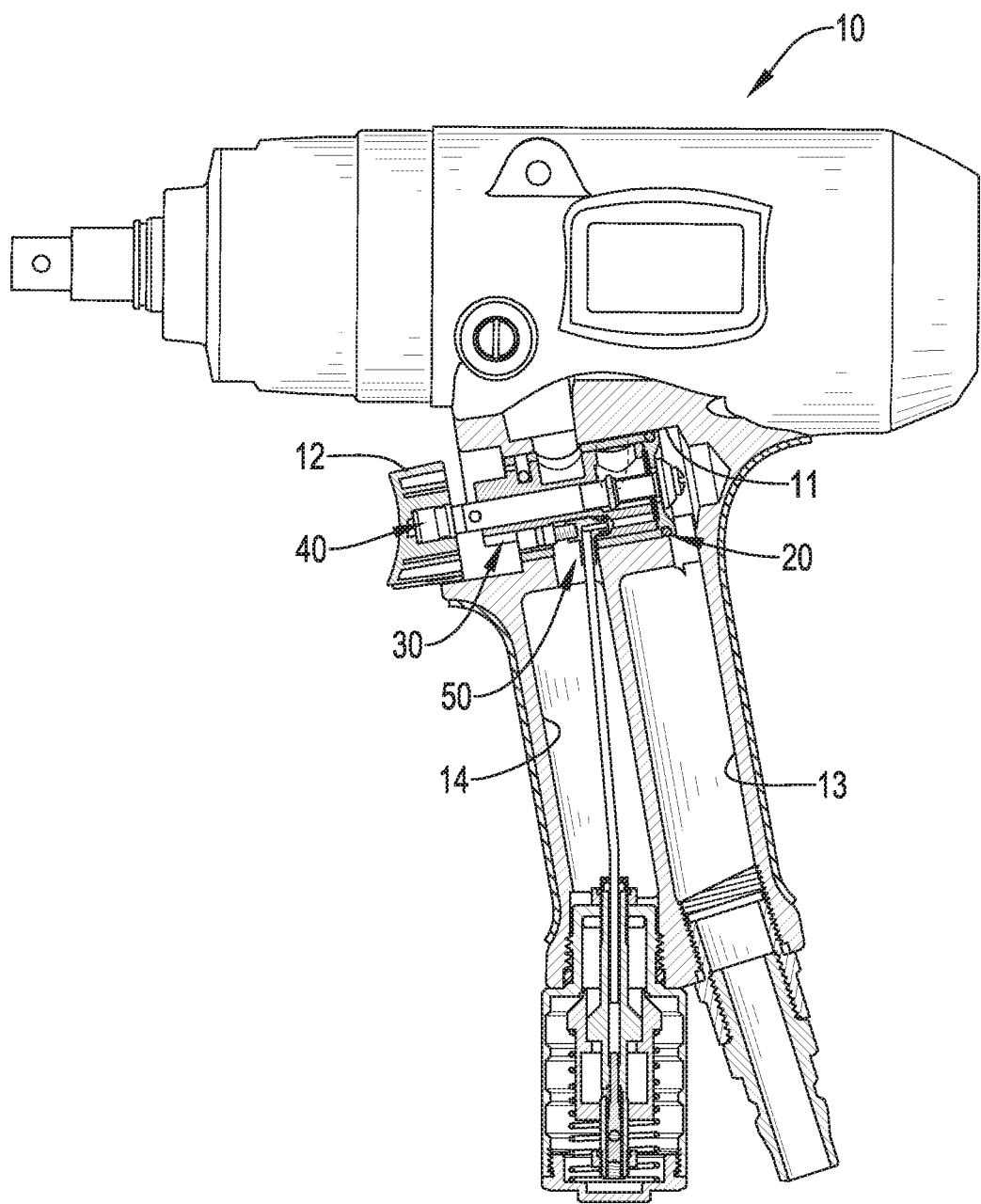
FIG. 1 is a side view in partial section of a pneumatic tool having a pneumatic signal generating device in accordance with the present invention.

With reference to FIGS. 1 to 4, a pneumatic signal generating device in accordance with the present invention is mounted in a trigger chamber 11 of a pneumatic tool 10, is connected with a trigger assembly 12 and comprises a valve sleeve 20, a valve core 30, a piston pin 40, and a guiding assembly 50.

With reference to FIG. 1, the pneumatic tool 10 may be conventional and has an inlet channel 13 and an outlet channel 14. The trigger chamber 11 is defined laterally in a body of the pneumatic tool 10. The inlet channel 13 and the outlet channel 14 communicate with the trigger chamber 11.

Figure 2:
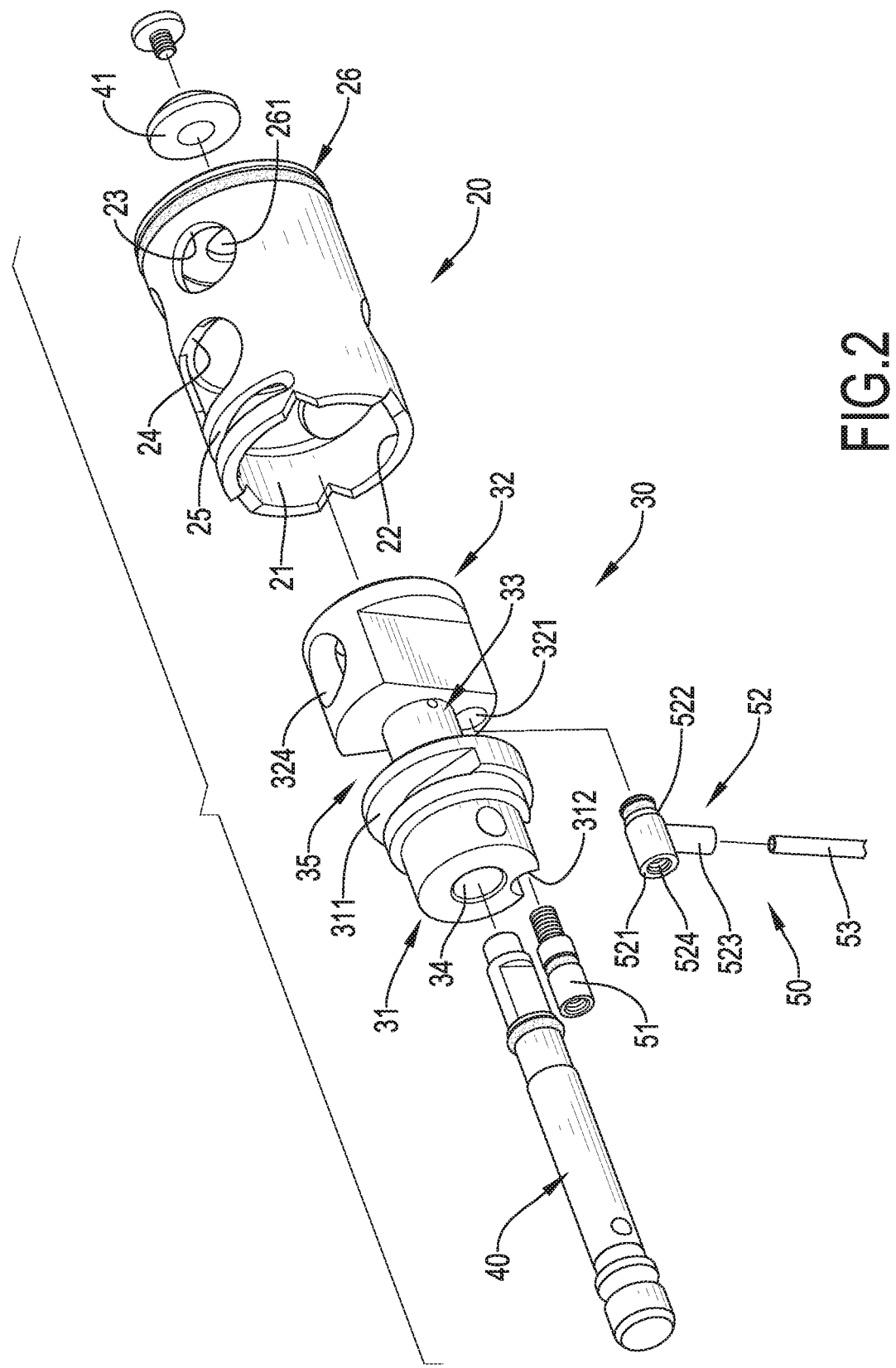
FIG. 2 is an enlarged exploded perspective view of the pneumatic signal generating device in FIG. 1.

With reference to FIGS. 1 and 2, the valve sleeve 20 is mounted in the trigger chamber 11 of the pneumatic tool 10, is cylindrical in shape, and has a sleeve chamber 21, an opening 22, two inlets 23, two outlets 24, a limiting groove 25, and an input end 26. The sleeve chamber 21 is defined in the valve sleeve 20. The opening 22 is defined in an end of the valve sleeve 20 facing the trigger assembly 12 and communicates with the sleeve chamber 21. The two inlets 23 are defined radially in the valve sleeve 20 at positions away from the opening 22 and communicate with the sleeve chamber 21. The two outlets 24 are defined radially in the valve sleeve 20, are diametrically opposite each other, and communicate with the sleeve chamber 21. The limiting groove 25 is curved, is defined radially in the valve sleeve 20 at a position between the opening 22 and the outlets 24, and communicates with the sleeve chamber 21. The input end 26 is defined in an end of the valve sleeve 20 opposite the opening 22 and has a pin hole 261 defined through the input end 26.

Figure 3:
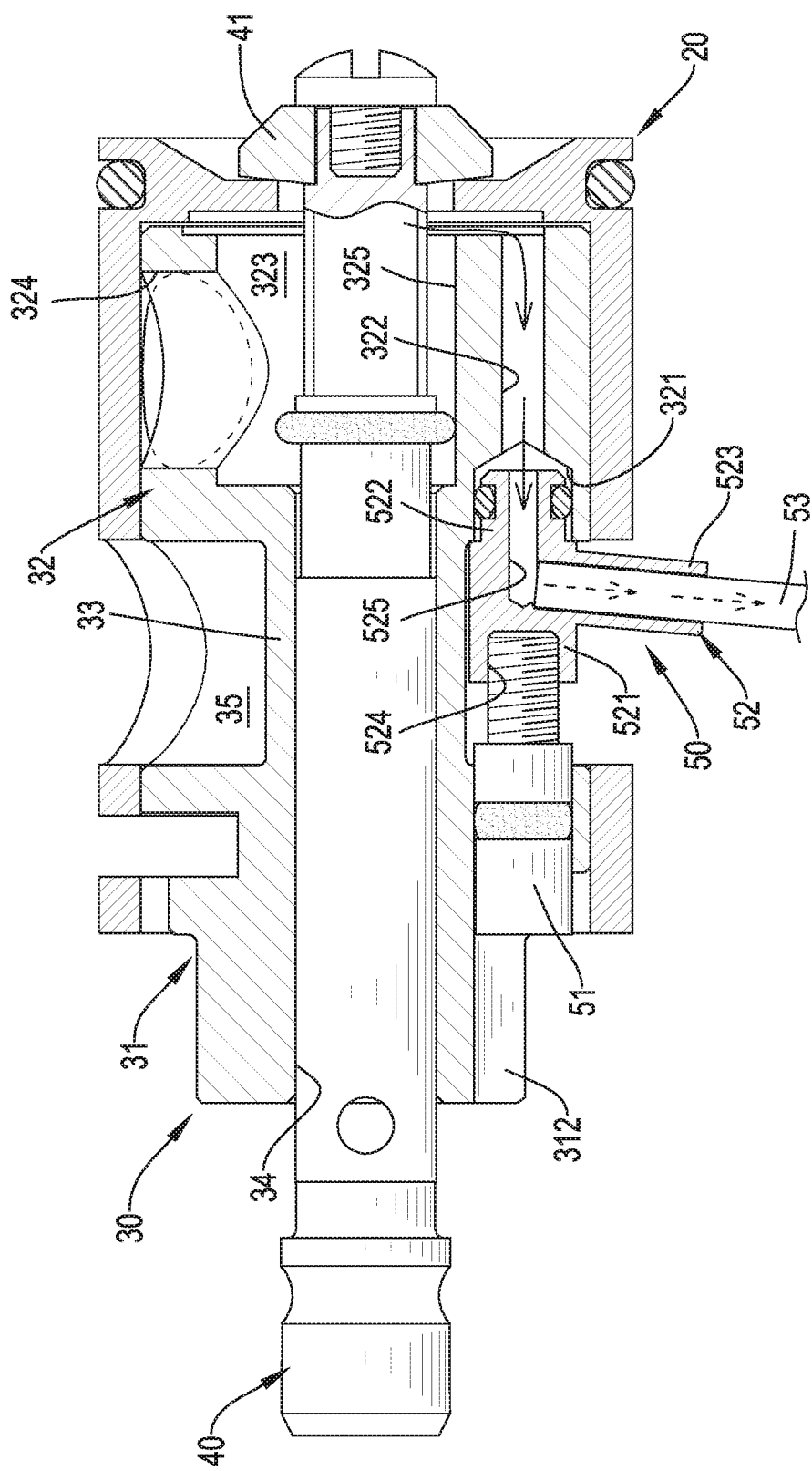
FIG. 3 is a side view in partial section of the pneumatic signal generating device in FIG. 2.

With reference to FIGS. 1 to 3, the valve core 30 is mounted rotatably in the sleeve chamber 21 of the valve sleeve 20 and comprises an input segment 32, an output segment 31, a connection segment 33, an axial hole 34, and an annular groove 35. The input segment 32 is formed on an end of the valve core 30, and the output segment 31 is formed on an end of the valve core 30 opposite the input segment 32. The connection segment 33 is mounted between the input segment 32 and the output segment 31 to connect the input segment 32 with the output segment 31. The axial hole 34 is defined axially through the input segment 32, the connection segment 33, and the output segment 31. The annular groove 35 is defined around an outer surface of the valve core 30 at a position corresponding to the two outlets 24 in the valve sleeve 20 and is preferably defined between the input segment 32 and the output segment 31 and formed around the connection segment 33.

With reference to FIGS. 2 and 3, the output segment 31 further has a notch 311 and a positioning recess 312. The notch 311 is defined radially in the output segment 31 at a position corresponding to the limiting groove 25. The positioning recess 312 is defined longitudinally in the output segment 31 and is diametrically opposite to the notch 311. The input segment 32 has a mounting hole 321, a guiding channel 322, an input chamber 323, an input hole 324, and a guiding recess 325. The mounting hole 321 is defined longitudinally in the input segment 32 and is co-axial with the positioning recess 312 in the output segment 31. The guiding channel 322 is longitudinally in the input segment 32, is co-axial with the mounting hole 321, and communicates with the mounting hole 321 and the sleeve chamber 21. The input chamber 323 is defined in the input segment 32 and communicates with the axial hole 34. The input hole 324 is defined radially in the input segment 32 and communicates with the input chamber 323 and one of the inlets 23 in the valve sleeve 20. The guiding recess 325 is defined in an end of the input segment 32 facing the pin hole 26 of the valve sleeve 20. The end of the input segment 32 provided with the guiding recess 325 is adjacent to the input end 26 of the valve sleeve 20, such that the compressed air entering into the pin hole 261 can be led into the guiding channel 322 and the input chamber 323 via the guiding recess 325.

With reference to FIGS. 1 and 2, the piston pin 40 is mounted through the axial hole 34 of the valve core 30 and has a first end extending out of the pin hole 261 of the valve sleeve 20 and a second end connected with the trigger assembly 12. The first end of the piston pin 40 is combined with a sealing cap 41. With the sealing cap 41, the pin hole 261 can be sealed and the compressed air can be kept from entering into the valve sleeve 20 and the valve core 30.

With reference to FIGS. 2 and 3, the guiding assembly 50 is combined rotatably with the valve core 30 and comprises a fastening member 51, a signal member 52 and a guiding tube 53. The fastening member 51 is mounted in the positioning recess 312 and preferably is a bolt. The signal member 52 is mounted in the mounting hole 321 and is co-axial with the fastening member 51. The signal member 52 may be T-shaped and has a mounting segment 522 and a guiding segment 523. The mounting segment 522 extends laterally and has a first end inserted into the mounting hole 321 in the valve core 30 and a second end defined as a positioning end 521. A fastening hole 524 is defined in the positioning end 521 and is screwed with the fastening member 51. With the fastening member 51 being screwed with the fastening hole 524, the signal member 52 is held securely in the mounting hole 321. The guiding segment 523 protrudes inclinedly from the mounting segment 522. A guiding passage 525 is L-shaped, is defined in the mounting segment 522 and the guiding segment 523, communicates with the guiding channel 322 and is free from communicating with the fastening hole 524. When the fastening member 51 is rotated, the signal member 52 will be moved relative to the mounting hole 321 and the position of the signal member 52 is adjusted. The guiding tube 53 is inserted into an end of the guiding segment 523, communicates with the guiding passage 525, and extends into the outlet channel 14 of the pneumatic tool 10.

Figure 4:
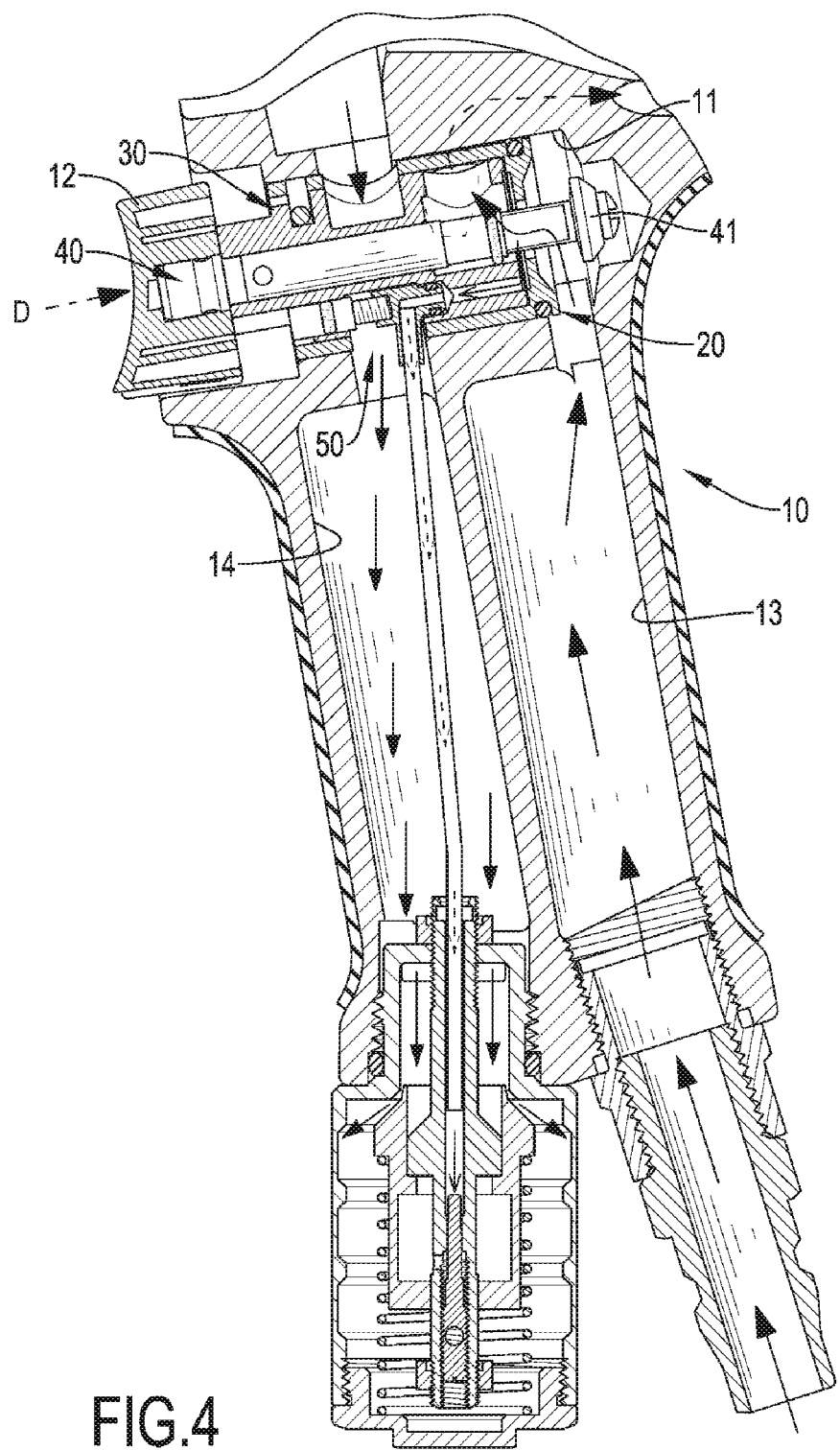
FIG. 4 is an enlarged operational side view in partial section of the pneumatic tool with the pneumatic signal generating device in FIG. 1.
Figure 5:
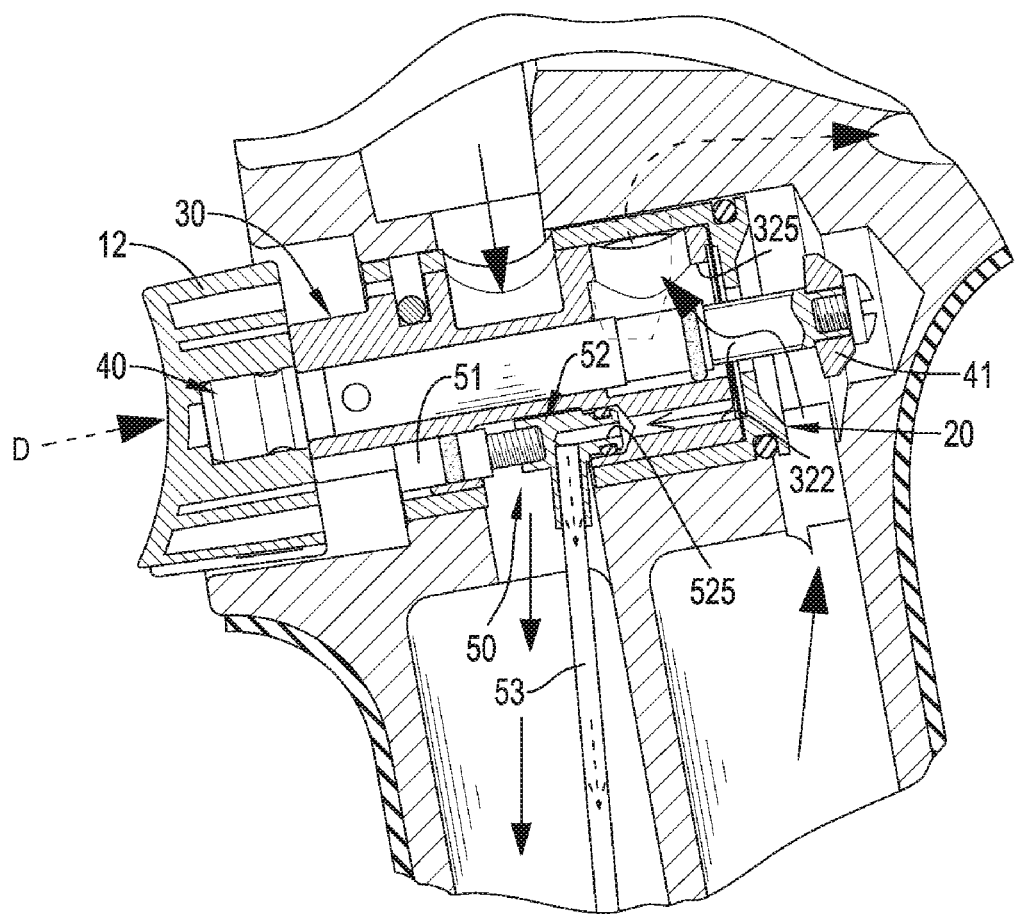
FIG. 5 is an enlarged operational side view of the pneumatic tool in FIG. 4.
Figure 6:
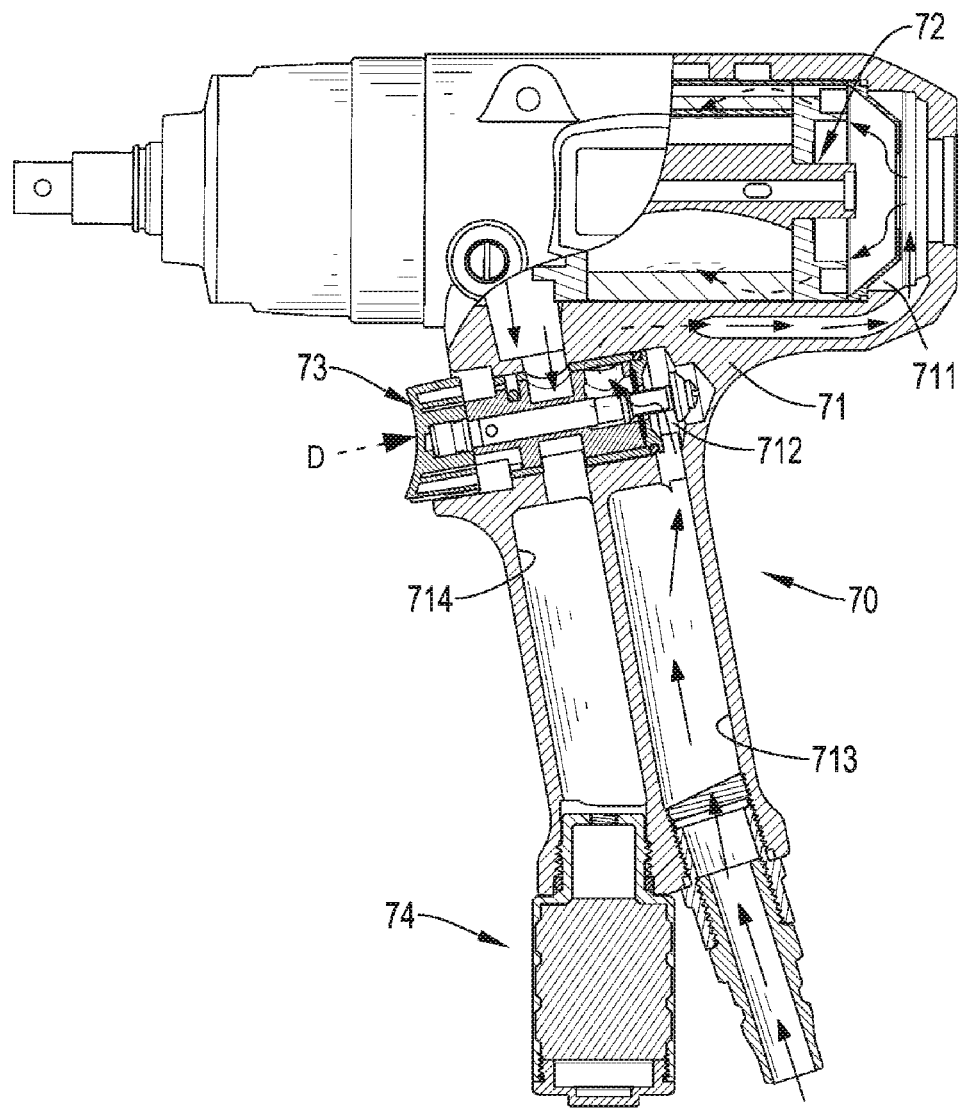
FIG. 6 is an enlarged operational cross sectional side view of the pneumatic signal generating device in FIG. 5.

With reference to FIGS. 3 to 5, when in use, the pneumatic tool 10 is connected with a compressed air source. When the trigger assembly 12 is pressed in the direction D, the piston pin 40 will be axially moved relative to the valve sleeve 30 and the sealing cap 41 will depart from the valve sleeve 20 to open the pin hole 261. At this time, the compressed air will enter the trigger chamber 11 via the inlet channel 13 and some of the compressed air will enter the guiding channel 322 via the pin hole 261 and the guiding recess 325. The compressed air shunt will then enter the guiding passage 525 of the signal member 52 and the guiding tube 53. Consequently, the compressed air shunt entering into the guiding tube 53 can serve as a pressure signal to be led to a counter or a pressure gauge connected with the outlet channel 14 of the pneumatic tool 10. Accordingly, the pressing times of the trigger assembly 12 or the pressure in the pneumatic tool 10 can be easily calculated or detected by the compressed air shunt, and additional electrical elements and wire arrangement are not necessary. In addition, the pneumatic signal generating device in accordance with the present invention can be easily assembled in a conventional pneumatic tool, and the weight and volume of the pneumatic tool will not be increased Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A pneumatic signal generating device for a pneumatic tool comprising:
 a valve sleeve comprising
  a sleeve chamber defined in the valve sleeve;
  an opening defined in an end of the valve sleeve and communicating with the sleeve chamber; and
  an input end defined in an end of the valve sleeve opposite the opening;
 a valve core mounted rotatably in the sleeve chamber of the valve sleeve and comprising
  an input segment formed on an end of the valve core;
  an output segment formed on an end of the valve core opposite the input segment and having a positioning recess defined in the output segment;
  a connection segment mounted between the input segment and the output segment to connect the input segment with the output segment;
  an axial hole defined axially through the input segment, the connecting segment, and the output segment of the valve core; and
  an annular groove defined between the input segment and the output segment and formed around the connection segment of the valve core;

a piston pin mounted moveably in the axial hole in the valve core and having an end extending out of the input end of the valve sleeve and connected with a sealing cap; and a guiding assembly connected rotatably with the valve core and comprising
- a fastening member mounted in the positioning recess of the output segment;
- a signal member connected with the input segment of the valve core, held in the annular groove in the valve core, and having
  - a positioning end extending laterally and connected securely with the fastening member; and
  - a passage defined in the signal member and communicating with the sleeve chamber of the valve sleeve; and
- a guiding tube connected with the signal member and communicating with the passage in the signal member.

2. The pneumatic signal generating device as claimed in claim 1, wherein
the input segment of the valve core comprises
- a mounting hole defined in the input segment; and
- a guiding channel defined in the input segment and communicating with the mounting hole and the sleeve chamber;

the signal member has an end mounted in the mounting hole in the input segment and communicates with the sleeve chamber via the guiding channel.

3. The pneumatic signal generating device as claimed in claim 2, wherein
the signal member comprises
- a mounting segment disposed on the end of the signal member, and extending laterally and inserted into the mounting hole in the valve core; and
- a guiding segment protruding inclinedly from the mounting segment.

* * * * *